United States Patent
Kang

(10) Patent No.: US 9,864,229 B2
(45) Date of Patent: Jan. 9, 2018

(54) COLOR FILTER PANEL AND LIQUID CRYSTAL DISPLAY DEVICE INCLUDING THE SAME

(71) Applicant: Samsung Display Co., Ltd., Yongin-si (KR)

(72) Inventor: Yoonho Kang, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 169 days.

(21) Appl. No.: 15/004,108

(22) Filed: Jan. 22, 2016

(65) Prior Publication Data

US 2016/0282668 A1    Sep. 29, 2016

(30) Foreign Application Priority Data

Mar. 26, 2015   (KR) .......................... 10-2015-0042609

(51) Int. Cl.
| | | |
|---|---|---|
| G02F 1/1339 | (2006.01) | |
| G02F 1/1335 | (2006.01) | |
| G02B 5/20 | (2006.01) | |
| G02F 1/1368 | (2006.01) | |

(52) U.S. Cl.
CPC ....... *G02F 1/133514* (2013.01); *G02B 5/201* (2013.01); *G02F 1/1368* (2013.01); *G02F 1/13394* (2013.01); *G02F 1/133512* (2013.01); *G02F 2001/13396* (2013.01); *G02F 2001/13398* (2013.01); *G02F 2001/133519* (2013.01)

(58) Field of Classification Search
CPC ......... G02F 1/136209; G02F 1/133512; G02F 1/133514; G02F 1/133516; G02F 2001/136222; G02F 2201/52; G02F 1/13394; G02F 2001/13396; G02F 2001/13398; G09G 3/2003; G09G 2300/0452; G09G 3/3607; G09G 3/3611; G09G 5/02; G02B 5/201; H01L 27/322; H01L 27/3213

See application file for complete search history.

(56) References Cited

U.S. PATENT DOCUMENTS

| | | | |
|---|---|---|---|
| 2004/0125279 A1* | 7/2004 | Lee | ................... G02F 1/133512 349/110 |
| 2005/0110922 A1* | 5/2005 | Lee | ..................... G02F 1/13394 349/106 |
| 2005/0179853 A1* | 8/2005 | Chen | ................... G02F 1/13394 349/155 |
| 2008/0266511 A1 | 10/2008 | Shimizu et al. | |

(Continued)

FOREIGN PATENT DOCUMENTS

| | | |
|---|---|---|
| KR | 1020020046172 | 6/2002 |
| KR | 1020100048798 | 5/2010 |

(Continued)

*Primary Examiner* — Jia Pan
(74) *Attorney, Agent, or Firm* — H.C. Park & Associates, PLC

(57) ABSTRACT

A liquid crystal display device includes: a first substrate; a thin film transistor disposed on the first substrate; a second substrate opposing the first substrate; a light shielding member disposed on the second substrate, the light shielding member including a first aperture and a second aperture; a color filter disposed in the first aperture; and a height adjustment member disposed in the second aperture.

8 Claims, 9 Drawing Sheets

(56) References Cited

U.S. PATENT DOCUMENTS

| | | | |
|---|---|---|---|
| 2009/0115954 A1* | 5/2009 | Tseng | G02F 1/13394 349/156 |
| 2011/0104974 A1* | 5/2011 | Ryu | G02F 1/133512 445/24 |
| 2011/0111668 A1 | 5/2011 | Chu et al. | |
| 2011/0128643 A1 | 6/2011 | Nakamata | |
| 2011/0156039 A1* | 6/2011 | Baek | G02F 1/13394 257/59 |
| 2011/0299002 A1* | 12/2011 | Won | G02B 5/201 349/43 |
| 2012/0268700 A1* | 10/2012 | Shu | G03F 7/0007 349/106 |
| 2012/0314163 A1* | 12/2012 | Joo | G02F 1/13394 349/106 |
| 2013/0342795 A1* | 12/2013 | Park | G02F 1/133512 349/110 |
| 2015/0253620 A1* | 9/2015 | Yang | G02F 1/133516 349/106 |
| 2015/0293279 A1* | 10/2015 | Pei | G02B 5/201 359/891 |

FOREIGN PATENT DOCUMENTS

| | | |
|---|---|---|
| KR | 1020100105625 | 9/2010 |
| WO | 0100794 | 1/2001 |

\* cited by examiner

240 : 241, 242, 243
222 : 223, 224, 225

240 : 241, 242, 243
222 : 223, 224, 225

240 : 241, 242, 243
222 : 223, 224, 225

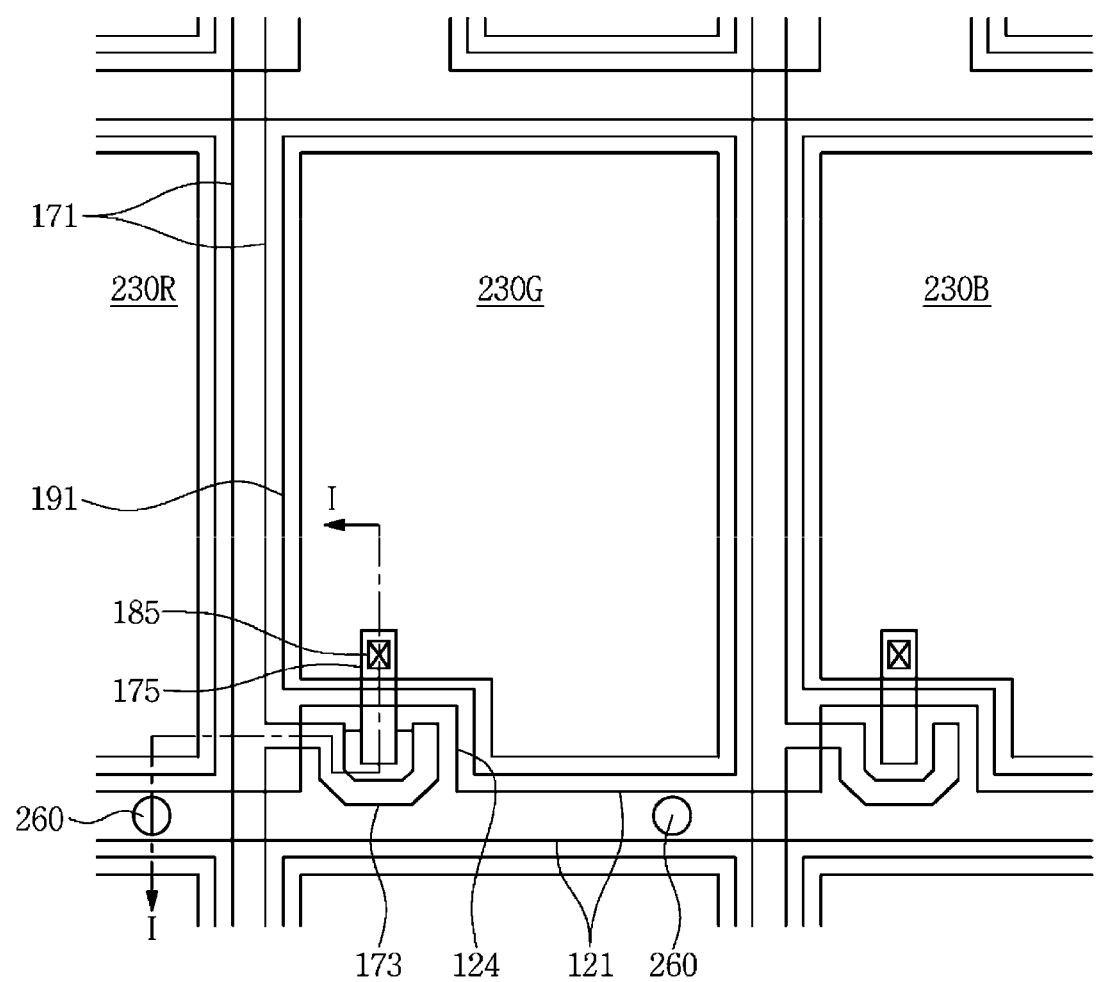

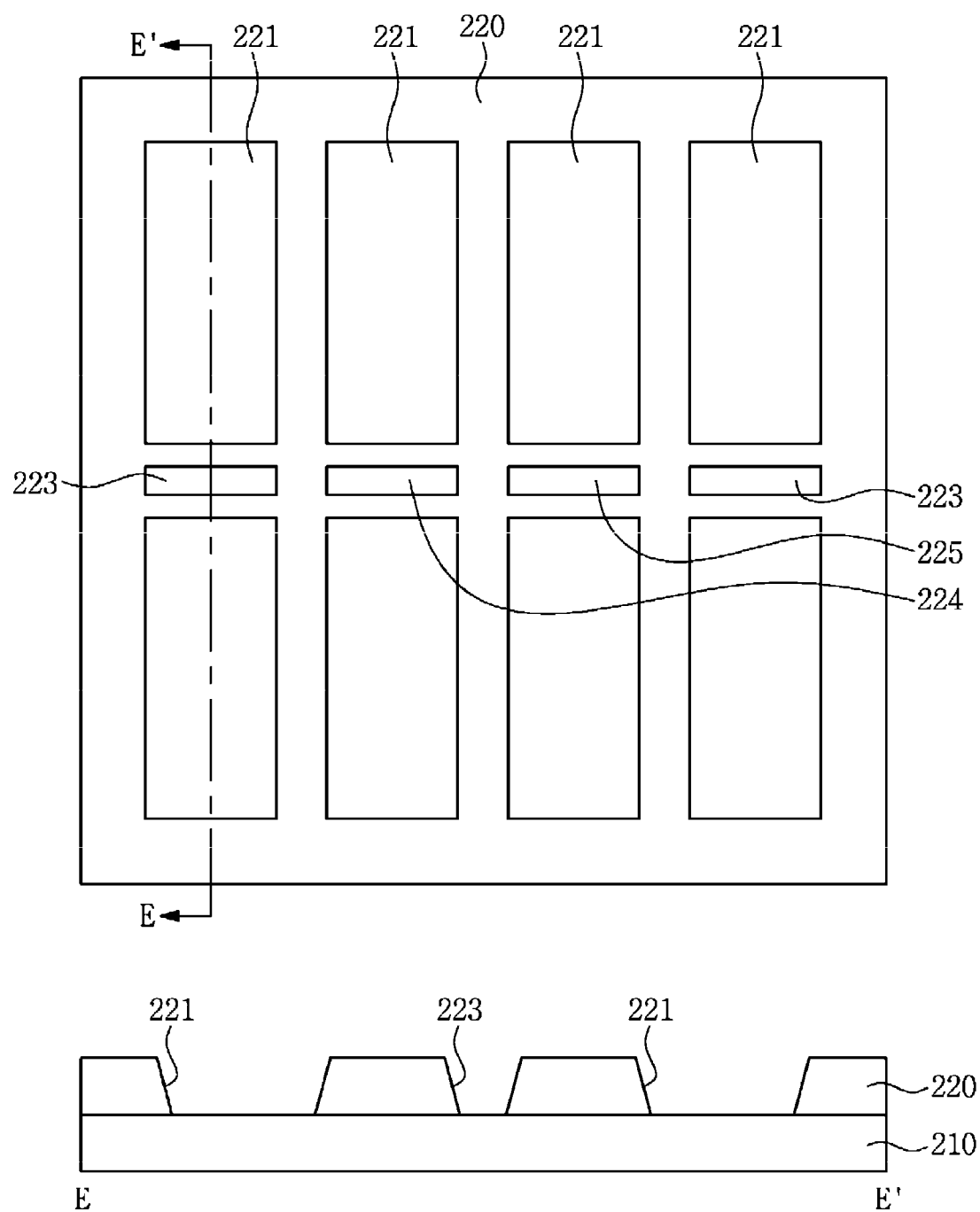

COLOR FILTER PANEL AND LIQUID CRYSTAL DISPLAY DEVICE INCLUDING THE SAME

CROSS-REFERENCE TO RELATED APPLICATION

This application claims priority from and the benefit of Korean Patent Application No. 10-2015-0042609, filed on Mar. 26, 2015, which is hereby incorporated by reference for all purposes as if fully set forth herein.

BACKGROUND

Field

Exemplary embodiments relate to a color filter panel and a liquid crystal display ("LCD") device including the same. More particularly, exemplary embodiments relate to a color filter panel which has better side visibility by disposing a height adjustment member so as to have a differentiated-cell-gap structure among red, green, and blue (RGB) pixel regions and an LCD device including the same.

Discussion of the Background

A liquid crystal display ("LCD") device may include two transparent substrates and a liquid crystal layer interposed therebetween. Such an LCD device displays a desired image by adjusting the light transmittance thereof for each pixel by driving the liquid crystal layer.

In general, LCD panels disposed in LCD devices are classified into a transmissive-type display panel and a transflective-type display panel. The transmissive-type display panel displays an image using internal light generated in a backlight assembly, and the transflective-type display panel displays an image using externally generated light in addition to internal light generated therein.

In particular, the transmissive-type display panel may need to have a differentiated-cell-gap structure based on properties of red light, green light, and blue light in order to enhance the visibility of the colors and the like. On the other hand, the transflective-type display panel may need to have a double-cell gap structure in which respective cell gaps in a transmissive area and a transflective area are different from one another, in order to significantly increase the transmittance thereof.

The differentiated-cell-gap structure typically employs a scheme of causing a difference between cell gaps by varying a thickness of red, green, and blue color filters.

Since a color filter commonly includes a red color filter, a green color filter, and a blue color filter, when two display panels are coupled to one another, the two display panels may need to be aligned properly to allow colors of respective pixels to face one another in a corresponding manner. However, since a light shielding member may need to be formed between pixels to occupy a relatively large space based on an alignment error of the two display panels, an aperture decreases, and thereby issues of a reduced aperture ratio, and the like, may occur.

To address such issues, a scheme of forming a color filter through an inkjet technique has been suggested. In the case of forming a color filter through the inkjet technique, it may be advantageous in that a manufacturing process thereof can be simplified due to the omission of an exposure device.

However, such a formation of a color filter through the inkjet technique may pose a difficulty in forming a differentiated-cell-gap structure using different thicknesses of color filters since the color filters are disposed in an aperture of a light shielding member. Further, in a case in which such a differentiated-cell-gap structure is formed using a column spacer that maintains a gap between an upper substrate and a lower substrate, manufacturing costs may increase.

The above information disclosed in this Background section is only for enhancement of understanding of the background of the inventive concept, and, therefore, it may contain information that does not form the prior art that is already known to a person of ordinary skill in the art.

SUMMARY

Exemplary embodiments provide a color filter panel and a liquid crystal display ("LCD") device including the same, in which the LCD device, including a color filter formed through an inkjet process, is enhanced in the side visibility thereof.

Additional aspects will be set forth in the detailed description which follows, and, in part, will be apparent from the disclosure, or may be learned by practice of the inventive concept.

An exemplary embodiment discloses a liquid crystal display device including: a first substrate; a thin film transistor disposed on the first substrate; a second substrate opposing the first substrate; a light shielding member disposed on the second substrate, the light shielding member including a first aperture and a second aperture; a color filter disposed in the first aperture; and a height adjustment member disposed in the second aperture.

An exemplary embodiment also discloses a color filter panel including: a substrate; a light shielding member disposed on the substrate, the light shielding member including a first aperture and a second aperture; a color filter disposed in the first aperture; and a height adjustment member disposed in the second aperture.

An exemplary embodiment also discloses a color filter panel including: a substrate; a light shielding member disposed on the substrate, the light shielding member including apertures for a color filter corresponding to a first color and apertures for a color filter corresponding to a second color; the color filter corresponding to the first color disposed in the apertures for the color filter corresponding to the first color; the color filter corresponding to the second color disposed in the apertures for the color filter corresponding to the second color; a first height adjustment member disposed between the apertures for the color filter corresponding to the first color; and a second height adjustment member disposed between the apertures for the color filter corresponding to the second color. The first height adjustment member and the second height adjustment member have different heights.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

FIG. 6 is a plan view schematically illustrating an LCD device according to an exemplary embodiment.

FIG. 8A, FIG. 8B, and FIG. 8C are views schematically illustrating sequential processes of a method of manufacturing a color filter panel according to an exemplary embodiment.

DETAILED DESCRIPTION OF THE ILLUSTRATED EMBODIMENTS

Figure 1:
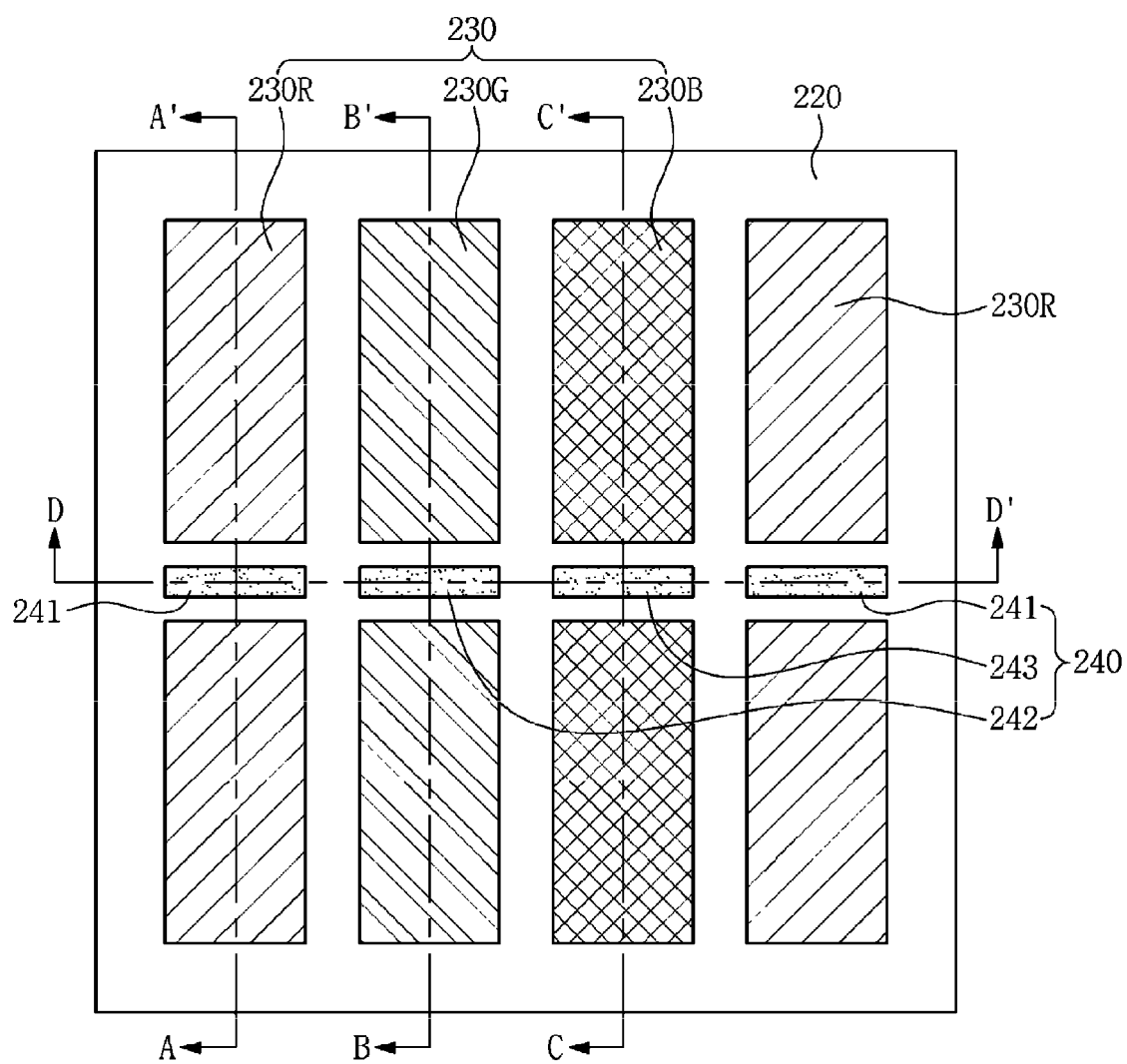
FIG. 1 is a plan view schematically illustrating a color filter panel according to an exemplary embodiment.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Figure 2:
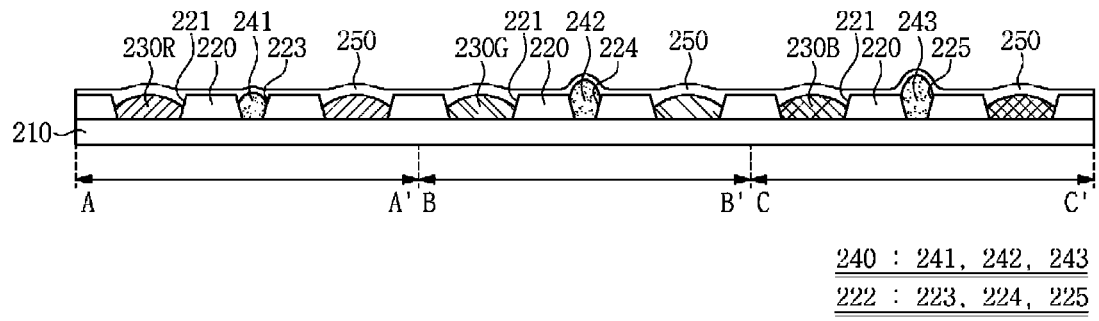
FIG. 2 is a cross-sectional view taken along section lines A-A', B-B', and C-C' of FIG. 1 according to an exemplary embodiment.
Figure 3:
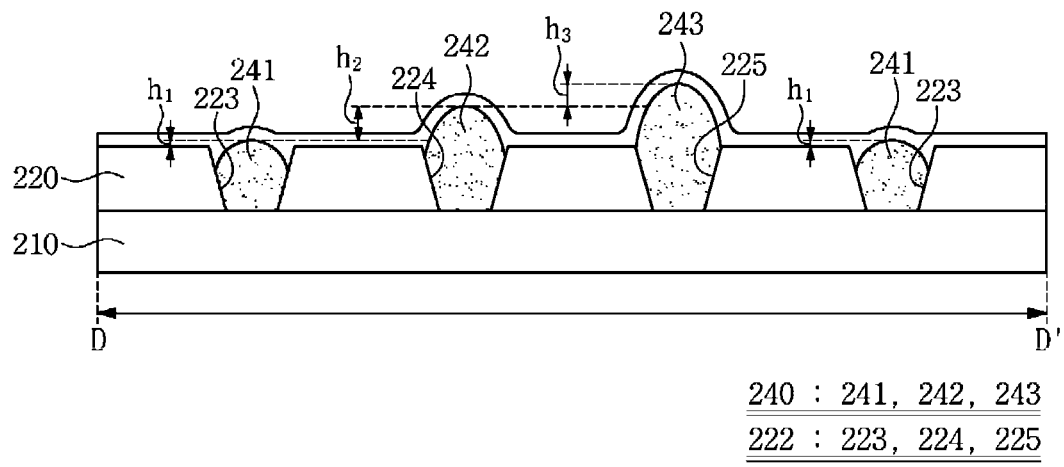
FIG. 3 is a cross-sectional view taken along section line D-D' of FIG. 1 according to an exemplary embodiment.
Figure 4:
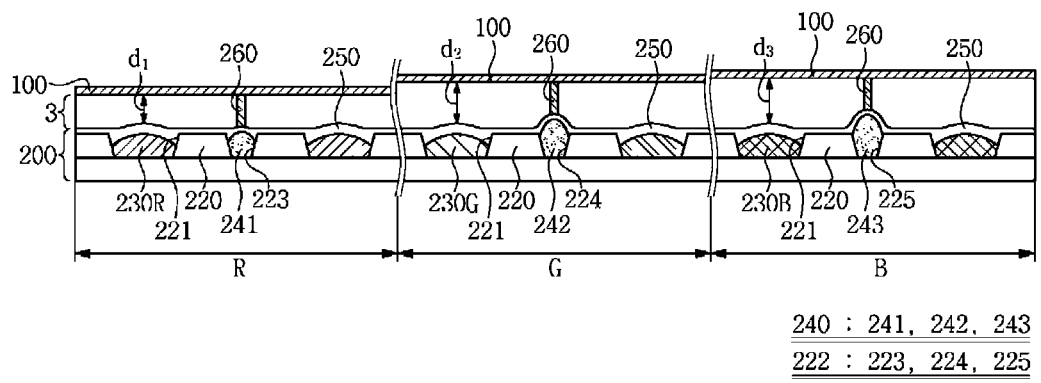
FIG. 4 is a cross-sectional view schematically illustrating a liquid crystal display ("LCD") device according to an exemplary embodiment.
Figure 5A:
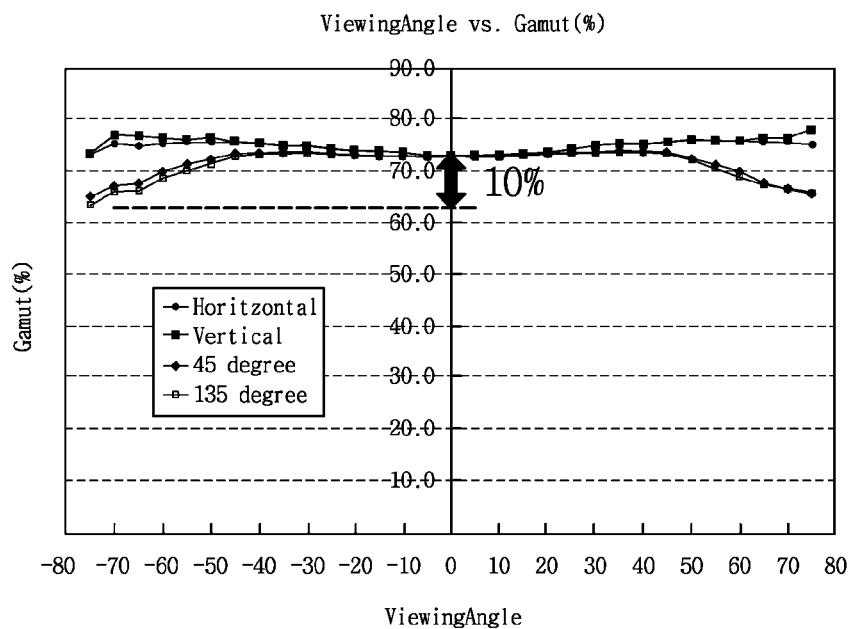
FIG. 5A and FIG. 5B are graphs illustrating a variation in a color reproduction ratio between a front view and a side view with respect to an LCD device according to comparative examples.
Figure 5B:
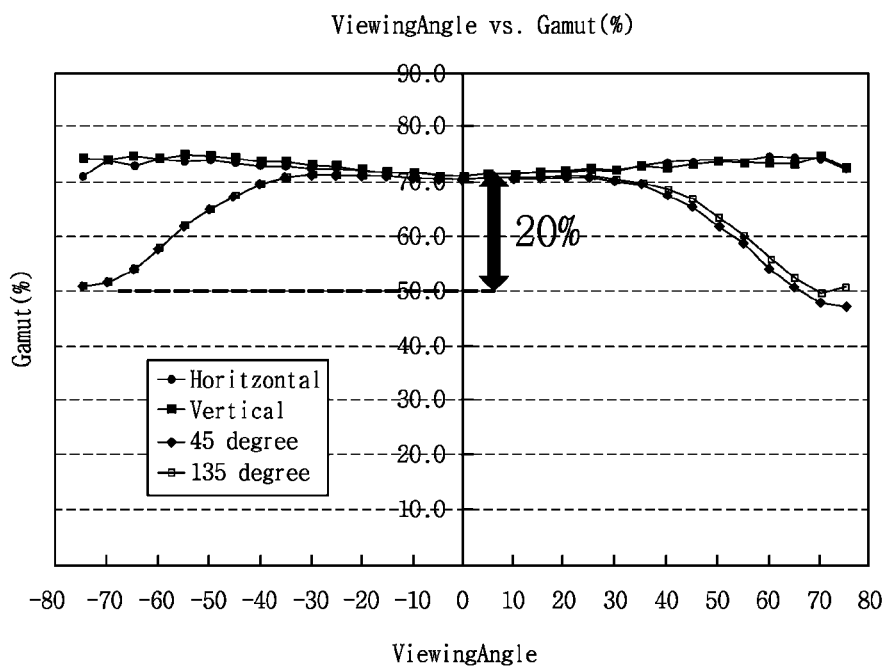
Figure 5C:
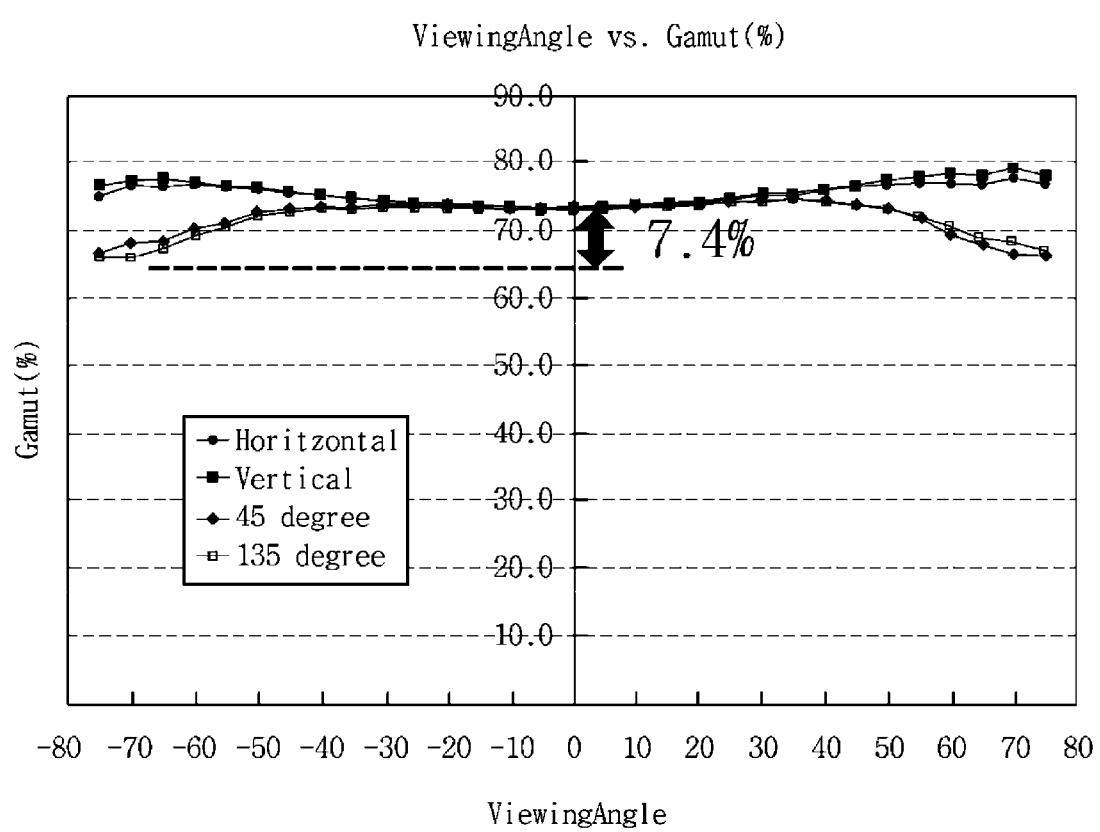
FIG. 5C is a graph illustrating a variation in a color reproduction ratio between a front view and a side view with respect to an LCD device according to an exemplary embodiment.

FIG. 1 is a plan view schematically illustrating a color filter panel according to an exemplary embodiment; FIG. 2 is a cross-sectional view taken along section lines A-A', B-B', and C-C' of FIG. 1 according to an exemplary embodiment; FIG. 3 is a cross-sectional view taken along section line D-D' of FIG. 1 according to an exemplary embodiment; FIG. 4 is a cross-sectional view schematically illustrating a liquid crystal display ("LCD") device according to an exemplary embodiment; FIG. 5A and FIG. 5B are graphs illustrating a variation in a color reproduction ratio between a front view and a side view with respect to an LCD device according to comparative examples; and FIG. 5C is a graph illustrating a variation in a color reproduction ratio between a front view and a side view with respect to an LCD device according to an exemplary embodiment.

Referring to FIG. 1 through FIG. 4, a light shielding member 220 and a color filter 230 may be disposed on a second substrate 210. The second substrate 210 may include a transparent material such as glass or plastic. The light shielding member 220 may be referred to as a black matrix, and may serve to prevent light leakage between pixels and may block and/or reflect incident light. The color filter 230 may display one of primary colors, for example, the three primary colors of red, green, and blue. An overcoat layer 250 may be disposed on the color filter 230 and the light shielding member 220.

More specifically, the light shielding member 220 may be disposed on the second substrate 210 and may have a first aperture 221 and a second aperture 222. For example, the light shielding member 220 may have a first aperture 221 in which a red color filter 230R is disposed, a first aperture 221 in which a green color filter 230G is disposed, and a first aperture 221 in which a blue color filter 230B is disposed. In addition, the light shielding member 220 may have the second aperture 222 including a first sub-aperture 223, a second sub-aperture 224, and a third sub-aperture 225.

The light shielding member 220 may have the second aperture 222 between the first apertures 221. For example, the light shielding member 220 may have the first sub-aperture 223 between the first apertures 221 in which the red color filters 230R are disposed, respectively, the second sub-aperture 224 between the first apertures 221 in which the green color filters 230G are disposed, respectively, and the third sub-aperture 225 between the first apertures 221 in which the blue color filters 230B are disposed, respectively.

The color filter 230 may be disposed in the first aperture 221 and may include the red color filter 230R, the green color filter 230G, and the blue color filter 230B.

A height adjustment member 240 may be disposed in the second aperture 222 and may include a first height adjustment member 241, a second height adjustment member 242, and a third height adjustment member 243. The height adjustment member 240 may include or may be formed of the same material as that forming the light shielding member 220 and may serve as a black matrix. For example, the first height adjustment member 241 may be interposed between the red color filters 230R and within the first sub-aperture 223. The second height adjustment member 242 may be interposed between the green color filters 230G and within the second sub-aperture 224. The third height adjustment member 243 may be interposed between the blue color filters 230B and within the third sub-aperture 225.

The height of the second height adjustment member 242 may be greater than the height of the first height adjustment member 241, and the height of the third height adjustment member 243 may be greater than the height of the second height adjustment member 242. For example, the height difference $h_2$ between the first height adjustment member 241 and the second height adjustment member 242 may be in a range of about 0.05 micrometers (μm) to about 0.15 μm, and the height difference $h_3$ between the second height adjustment member 242 and the third height adjustment member 243 may be in a range of about 0.05 μm to about 0.15 μm.

The height of the height adjustment member 240 may be greater than the height of the light shielding member 220. The height difference between the height adjustment member 240 and the light shielding member 220 may be in a range of about 0.1 μm to about 1 μm. In other words, the height difference $h_1$ between the first height adjustment member 241 and the light shielding member 220, the height difference "$h_1+h_2$" between the second height adjustment member 242 and the light shielding member 220, and the height difference "$h_1+h_2+h_3$" between the third height adjustment member 243 and the light shielding member 220 may be in the range of about 0.1 μm to about 1 μm. The height difference "$h_1+h_2+h_3$" between the third height adjustment member 243 and the light shielding member 220 may be greater than the height difference "$h_1+h_2$" between the second height adjustment member 242 and the light shielding member 220, and the height difference "$h_1+h_2$" between the second height adjustment member 242 and the light shielding member 220 may be greater than the height difference $h_1$ between the first height adjustment member 241 and the light shielding member 220. Unlike FIG. 3, the first height adjustment member 241 may be taller than the second height adjustment member 242 or the third height adjustment member. According to an exemplary embodiment, to the first height adjustment member 241, the second height adjustment member 242, and the third height adjustment member 243 may have different heights. Further, two of the three height adjustment members 240 may have the same heights while the other one has a different height according to an exemplary embodiment.

Referring to FIG. 4, a support member 260 may be disposed on a portion of the overcoat layer 250 corresponding to the height adjustment members 240. Support members 260 disposed on the first height adjustment member 241, the second height adjustment member 242, and the third height adjustment member 243, respectively, may have the same height. In other words, the support member 260 according to an exemplary embodiment may all have the same height as shown in FIG. 4.

As the height adjustment members 240 and the support members 260 are disposed in such a manner as described above, a cell gap $d_1$ in a red pixel region R in which the red color filter 230R is disposed, a cell gap $d_2$ in a green pixel region G in which the green color filter 230G is disposed, and a cell gap $d_3$ in a blue pixel region B in which the blue color filter 230B is disposed may be formed to have different heights from one another. According to an exemplary embodiment, among the three cell gaps $d_1$, $d_2$, and $d_3$ the cell gap $d_3$ in the blue pixel region B may be the highest, the cell gap $d_2$ in the green pixel region G may be the second highest, and the cell gap $d_1$ in the red pixel region R may be the lowest. In this regard, by allowing the cell gaps $d_1$, $d_2$, and $d_3$ of the respective red, green, and blue pixel regions R, G, and B to differ from one another, an inter-gray scale color shift phenomenon may be reduced and side visibility may be enhanced. In addition, the support members 260 may not need to be formed to have different heights for the red, green, and blue pixels regions R, G, and B, respectively, and thus the manufacturing costs thereof may be reduced.

Although FIG. 4 illustrates that the cell gap $d_3$ in the blue pixel region B is greater than the cell gaps $d_1$ and $d_2$ in the red pixel region R and the green pixel region G, aspects of an exemplary embodiment may not be limited as such. For example, the cell gap in the red pixel region R may be greater than the cell gap in the green pixel region G or the cell gap in the blue pixel region B. Further, the cell gap in the greem pixel region G may be greater than the cell gap in the blue pixel region B.

Further, in some RGB pixels including the red pixel region R, the green pixel region G, and the blue pixel region B, the cell gap in the blue pixel region B may be the greatest in comparison with the cell gaps in the red pixel region R and the green pixel region G as shown in FIG. 4; however, the cell gap in the green pixel region G or the cell gap in the red pixel region R may be the greatest in other RGB pixels.

Further, according to an exemplary embodiment, the second aperture 222 may not be formed and the height adjustment members 240 may be disposed on the light shielding member 220.

Referring to FIG. 5A, FIG. 5B, and FIG. 5C, a set of graphs illustrating a relationship between a color region and a viewing angle is provided. A "Y" axis corresponds to the color region and an "X" axis corresponds to the viewing angle. Each number on the X axis denotes a viewing angle relative to a front view with respect to an LCD device. For example, an angle of zero degree indicates a case where the LCD device is viewed from the front view, which is a direction perpendicular to the top surface of the substrate 210. FIG. 5A illustrates a color deviation based on a viewing angle of an LCD device using a color filter panel formed through a conventional photolithography process; FIG. 5B illustrates a color deviation based on a viewing angle of an LCD device using a color filter panel formed through an inkjet process; and FIG. 5C illustrates a color deviation based on a viewing angle of an LCD device using the color filter panel according to an exemplary embodiment. FIGS. 5A, 5B, and 5C illustrate the color deviations based on the viewing angles of the respective LCD devices, and it may be appreciated that the side visibility of the LCD device is enhanced as the color deviation decreases. More specifically, as the color deviation based on the viewing angle decreases, it may be more likely to obtain the same level of visibility from the front view as well as from a side view with respect to the LCD device.

Accordingly, in the case of using the color filter panel formed through the conventional photolithography process, the color deviation may be about 10%; in the case of using the color filter panel formed through the inkjet process, the color deviation may be about 20%; and in the case of using the color filter panel according to an exemplary embodiment, the color deviation may be about 7.4%. In this regard, it may be verified based on the experiment results obtained as above that side visibility may be rather enhanced in the case of using the color filter panel according to an exemplary embodiment as compared to the other two cases.

A common electrode may further be disposed in the LCD device of FIG. 4 based on a type of the LCD device. In the case of disposing the common electrode, the support members 260 may be disposed on a portion of the common electrode corresponding to the height adjustment members 240.

Hereinafter, an LCD device including the color filter panel of FIG. 1 will be described in detail with reference to FIG. 6 and FIG. 7.

Figure 7:
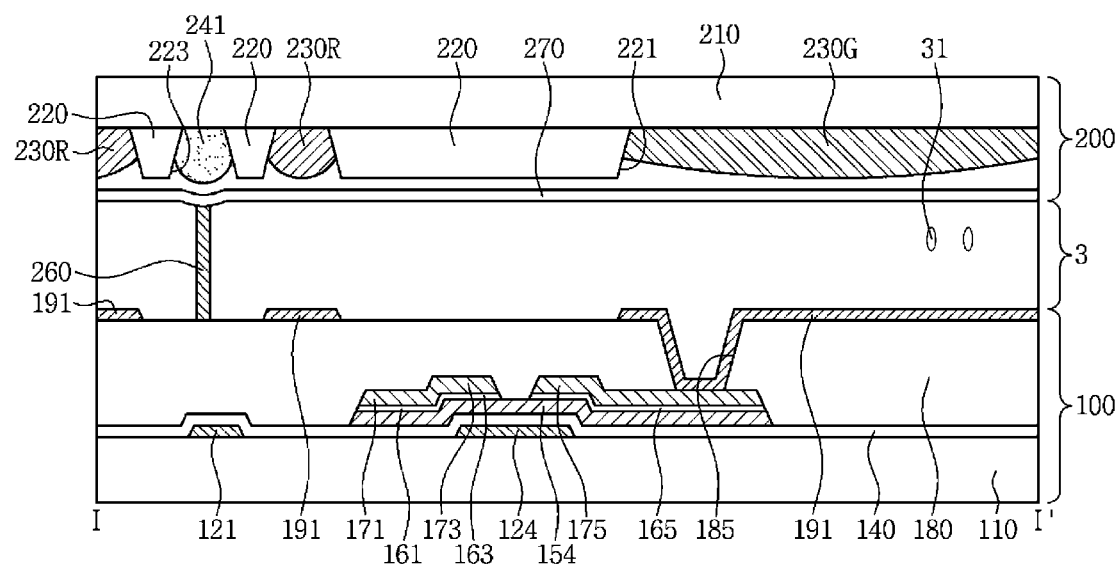
FIG. 7 is a cross-sectional view taken along section line I-I' of FIG. 6 according to an exemplary embodiment.

FIG. 6 is a plan view schematically illustrating an LCD device according to an exemplary embodiment; and FIG. 7 is a cross-sectional view taken along section line I-I' of FIG. 6 according to an exemplary embodiment.

Referring to FIG. 6 and FIG. 7, the LCD device may include a lower display panel 100 and an upper display panel 200 opposing one another, and a liquid crystal layer 3 interposed between the lower display panel 100 and the upper display panel 200.

A description pertaining to the lower display panel 100 will be provided hereinafter. The lower display panel 100 may correspond to a thin film transistor display panel.

A gate conductor including a plurality of gate lines 121 may be disposed on a first substrate 110, which includes a transparent material such as glass or plastic. The gate lines 121 may be disposed on the first substrate 110 in a first direction. The first direction may be a transverse direction. In other words, the gate line 121 may transmit a gate signal and may primarily extend in the transverse direction. The gate lines 121 may each include a plurality of gate electrodes 124.

A gate insulating layer 140 may be disposed on the gate line 121. The gate insulating layer 140 may include or may be formed of an inorganic insulating material such as silicon nitride ($SiN_x$) or silicon oxide ($SiO_x$).

A semiconductor 154 may be disposed on the gate insulating layer 140. The semiconductor 154 may include amorphous silicon, polycrystalline silicon, or an oxide semiconductor. The oxide semiconductor may include one or more of the following materials: zinc (Zn), gallium (Ga), indium (In), and tin (Sn).

For example, the oxide semiconductor may include or may be formed of an oxide semiconductor material, for example, Zn, Ga, Sn or In based oxide, or composite oxide such as zinc oxide (ZnO), indium-gallium-zinc oxide ($InGaZnO_4$), indium-zinc oxide (In—Zn—O), and/or zinc-tin oxide (Zn—Sn—O).

The oxide semiconductor may include IGZO-based oxide including In, Ga, Zn, and oxygen (O). Further, the oxide semiconductor may include In—Sn—Zn—O based metal oxide, In—Al—Zn—O based metal oxide, Sn—Ga—Zn—O based metal oxide, Al—Ga—Zn—O based metal oxide, Sn—Al—Zn—O based metal oxide, In—Zn—O based metal oxide, Sn—Zn—O based metal oxide, Al—Zn—O based metal oxide, In—O based metal oxide, Sn—O based metal oxide, and Zn—O based metal oxide.

Ohmic contact members 161, 163, and 165 may be disposed on the semiconductor 154. The ohmic contact members 161, 163 and 165 may include silicide or n+ hydrogenated amorphous silicon doped with n-type impurities at high concentration such as phosphorus. The ohmic contact members 161, 163 and 165 may be disposed on the semiconductor 154 in pairs. In the case in which the semiconductor 154 is the oxide semiconductor, the ohmic contact members 161, 163 and 165 may be omitted.

A data conductor including a data line 171 including a source electrode 173 or a drain electrode 175 may be disposed on the ohmic contact members 161, 163, and 165 and the gate insulating layer 140.

The ohmic contact members 161, 163, and 165 may only be present between the semiconductor 154 and the data line 171 and between the semiconductor 154 and the drain electrode 175, and may reduce contact resistance therebetween.

The data line 171 may be disposed on the first substrate 110 in a second direction, and may intersect the gate line 121. The second direction may be a longitudinal direction. In other words, the data line 171 may transmit a data signal and may primarily extend in the longitudinal direction. The extension direction of the data lines 171 may be substantially perpendicular to the extension direction of the gate lines 121.

The gate electrode 124, the source electrode 173, and the drain electrode 175 may constitute a single thin film transistor (TFT), along with the semiconductor 154. A channel of the TFT may be formed in the semiconductor 154 between the source electrode 173 and the drain electrode 175.

A protection layer 180 may be disposed on the data line 171, the drain electrode 175, and an exposed portion of the semiconductor 154. The protection layer 180 may include or may be formed of one or more of the following materials: an inorganic insulating material such as $SiN_x$ or $SiO_x$, an organic insulating material, and a low dielectric constant insulating material.

A pixel electrode 191 which is connected to the drain electrode 175 through a contact hole 185 may be disposed on the protection layer 180.

A description pertaining to the upper display panel 200 will be provided hereinafter. The light shielding member 220 and the color filters 230 including the red color filter 230R, the green color filter 230G, and the blue color filter 230B may be disposed on the second substrate 210. The second substrate 210 may include a transparent material such as glass or plastic. The light shielding member 220 may be referred to as a black matrix, and may serve to prevent light leakage between pixels. The color filter 230 may display one of primary colors, for example, the three primary colors of red, green, and blue. However, aspects are not limited thereto. For example, other colors such as white may be displayed using different color filters. The overcoat layer 250 may be disposed on the color filter 230 and the light shielding member 220. A common electrode 270 may be disposed on the overcoat layer 250. The light shielding member 220 may have the first aperture 221 and the second aperture 222. The color filter 230 may be disposed in the first aperture 221 and the height adjustment member 240, e.g., the first height adjustment member 241, may be disposed in the second aperture 222. The support member 260 may be disposed on a portion of the common electrode 270 corresponding to the height adjustment member 240. For any description pertaining to the configuration omitted in FIG. 6 and FIG. 7, reference may be made to the analogous features thereof described in FIG. 1 through FIG. 4.

The liquid crystal layer 3 may include a liquid crystal molecule 31 having dielectric anisotropy. The liquid crystal molecule 31 may be aligned to have a major axis thereof perpendicular to the lower display panel 100 and the upper display panel 200 when an electric field is not applied in the liquid crystal layer 3, and may have a positive dielectric anisotropy. The liquid crystal molecule 31 may be a nematic liquid crystal molecule having a structure in which a direction of a major axis of the nematic liquid crystal molecule is twisted into a spiral shape from the lower display panel 100 to the upper display panel 200. However, other liquid crystal layer structures may also be employed.

The upper display panel 200 and the lower display panel 100 having the structure as described above may be aligned to be coupled to one another and liquid crystal materials may be injected therebetween to be vertically aligned, and a basic structure of the LCD device according to an exemplary embodiment may be provided.

Hereinafter, a method of manufacturing the LCD device according to an exemplary embodiment will be described with reference to FIG. 8A, FIG. 8B, and FIG. 8C.

Figure 8B:
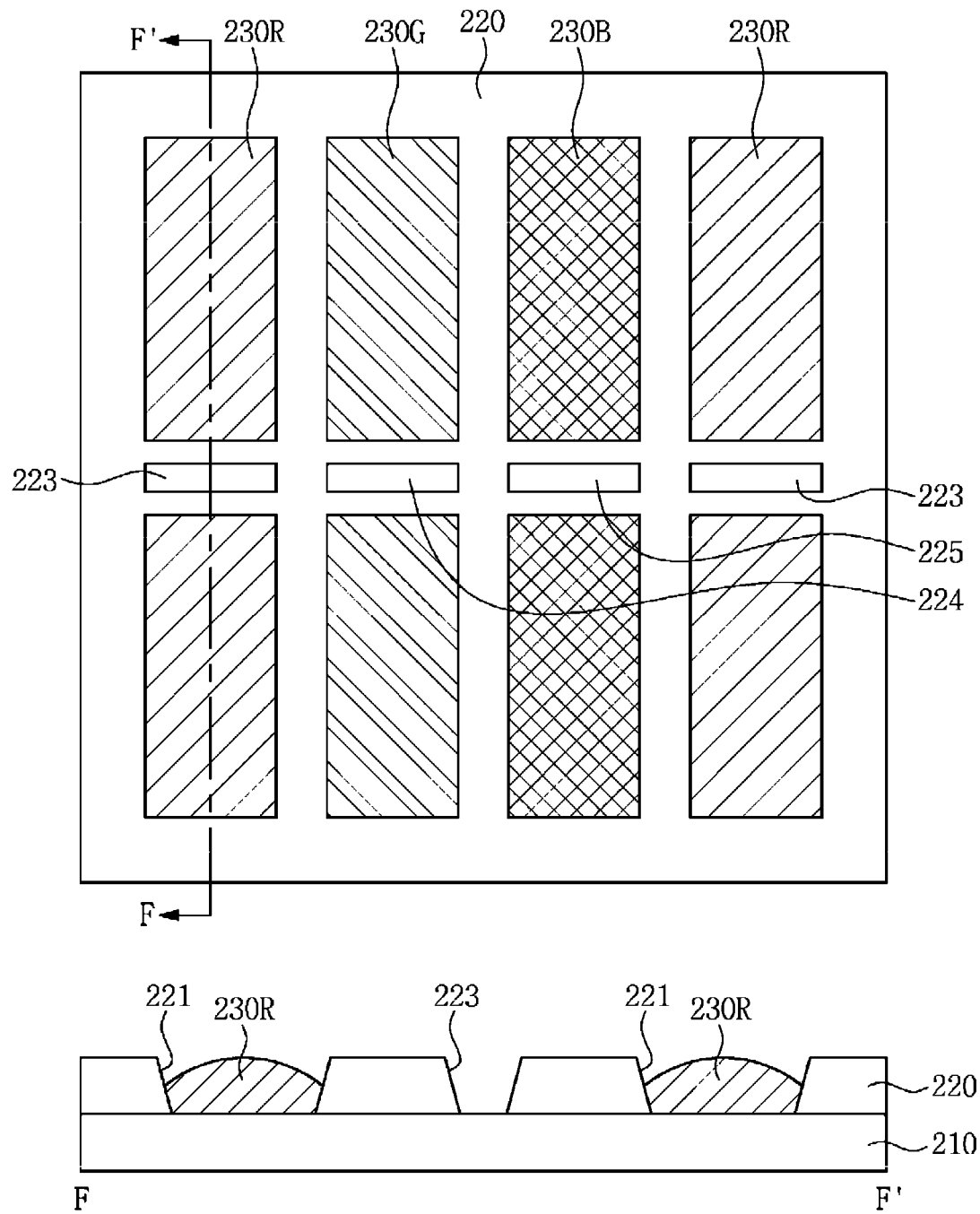
Figure 8C:
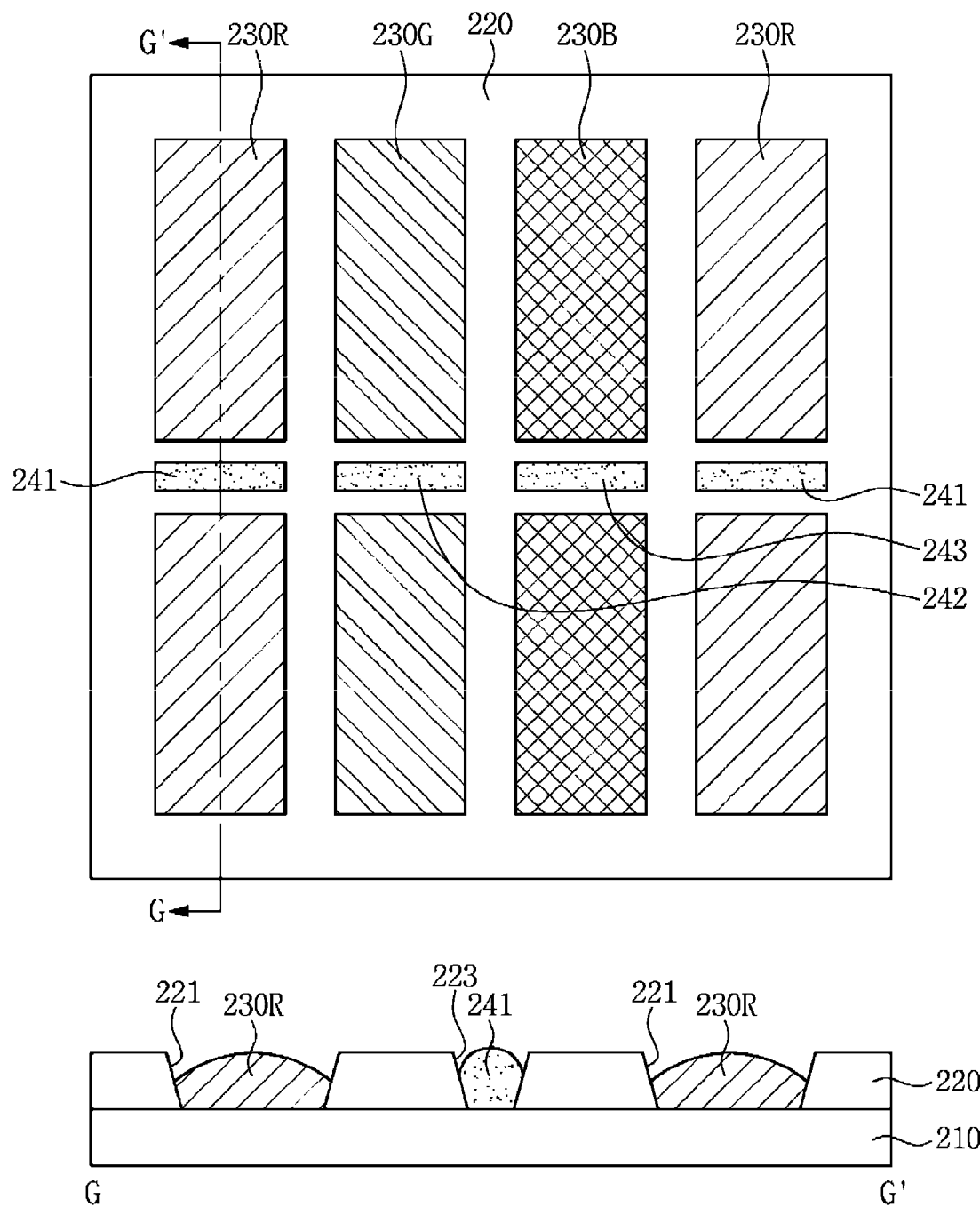

FIG. 8A, FIG. 8B, and FIG. 8C are views schematically illustrating sequential processes of a method of manufacturing the color filter panel according to an exemplary embodiment.

Referring to FIG. 8A through FIG. 8C, the light shielding member 220 may be disposed on the second substrate 210. The first aperture 221 and the second aperture 222, which may be one of the apertures 223, 224, and 225, may be formed in the light shielding member 220 through various processes such as a photolithography process. The color filter 230 may be disposed in the first aperture 221 through e.g., an inkjet process. The height adjustment member 240 may be disposed in the second aperture 222 using the same material as that forming the light shielding member 220.

As set forth above, according to one or more exemplary embodiments, the inter-gray scale color deviation may be reduced by forming the cell gaps differently for the respective red, green, and blue color filters, and may enhance the side visibility thereof.

In addition, the differentiated-cell-gap structure among the color filters may be readily formed even in the color filter panel formed through the inkjet process.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A liquid crystal display device comprising: a first substrate;
   a thin film transistor disposed on the first substrate;
   a second substrate opposing the first substrate;
   a light shielding member disposed on the second substrate, the light shielding member comprising a first aperture and a second aperture;
   a color filter disposed in the first aperture;
   a height adjustment member disposed in the second aperture;
   wherein the first aperture comprises at least two separate apertures, and the second aperture is disposed between the at least two separate apertures;
   wherein the color filter comprises at least one of a red color filter, a green color filter, and a blue color filter;
   wherein the height adjustment member comprises: a first height adjustment member interposed between color filters having a first color, a second height adjustment member interposed between color filters having a second color, and a third height adjustment member interposed between color filters having a third color;
   wherein a height of the second height adjustment member is greater than a height of the first height adjustment member, and a height of the third height adjustment member is greater than the height of the second height adjustment member; and
   support members disposed on the first height adjustment member, the second height adjustment member, and the third height adjustment member respectively.

2. The liquid crystal display device of claim 1, wherein a height difference between the first height adjustment member and the second height adjustment member is in a range of about 0.05 µm to about 0.15 µm, and a height difference between the second height adjustment member and the third height adjustment member is in a range of about 0.05 µm to about 0.15 µm.

3. The liquid crystal display device of claim 1, wherein a height of the height adjustment member is greater than a height of the light shielding member.

4. The liquid crystal display device of claim 3, wherein a height difference between the height adjustment member and the light shielding member is in a range of about 0.1 µm to about 1 µm.

5. The liquid crystal display device of claim 1, further comprising an overcoat layer covering the light shielding member, the color filter, and the height adjustment member.

6. The liquid crystal display device of claim 5, further comprising the support members disposed on the overcoat layer corresponding to the height adjustment member.

7. The liquid crystal display device of claim 5, further comprising: a common electrode disposed on the overcoat layer; and
   the support members disposed on the common electrode corresponding to the height adjustment member.

8. The liquid crystal display device of claim 1, wherein the light shielding member and the height adjustment member comprise a same material.

* * * * *